(12) United States Patent
Hieida et al.

(10) Patent No.: US 10,878,288 B2
(45) Date of Patent: Dec. 29, 2020

(54) DATABASE CONSTRUCTION SYSTEM FOR MACHINE-LEARNING

(71) Applicant: HITACHI, LTD., Tokyo (JP)

(72) Inventors: Yusuke Hieida, Tokyo (JP); Takuya Naka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 90 days.

(21) Appl. No.: 16/310,966

(22) PCT Filed: Jun. 30, 2017

(86) PCT No.: PCT/JP2017/024099
§ 371 (c)(1),
(2) Date: Dec. 18, 2018

(87) PCT Pub. No.: WO2018/020954
PCT Pub. Date: Feb. 1, 2018

(65) Prior Publication Data
US 2020/0202175 A1 Jun. 25, 2020

(30) Foreign Application Priority Data
Jul. 29, 2016 (JP) ................. 2016-149184

(51) Int. Cl.
*G06K 9/62* (2006.01)
*G06N 20/00* (2019.01)
*G06T 17/05* (2011.01)
(52) U.S. Cl.
CPC ........... *G06K 9/6257* (2013.01); *G06N 20/00* (2019.01); *G06T 17/05* (2013.01)

(58) Field of Classification Search
CPC ....... G06K 9/6257; G06N 20/00; G06T 17/05
See application file for complete search history.

(56) References Cited

U.S. PATENT DOCUMENTS

| 2014/0161346 | A1 | 6/2014 | Ishiyama et al. |
| 2017/0097274 | A1* | 4/2017 | Thorpe .............. G06K 9/00201 |
| 2017/0344907 | A1 | 11/2017 | Arai |

FOREIGN PATENT DOCUMENTS

| JP | 2000-163685 A | 6/2000 |
| JP | 2006-172099 A | 6/2006 |

(Continued)

OTHER PUBLICATIONS

An English machine translation of JP 2014-157509. (Year: 2014).*

(Continued)

*Primary Examiner* — Ruiping Li
(74) *Attorney, Agent, or Firm* — Mattingly & Malur, PC

(57) ABSTRACT

An object is to provide a database construction system for machine-learning that can automatically simply create virtual image data and teacher data in large volumes. A database construction system for machine-learning includes: a three-dimensional shape data input unit configured to input three-dimensional shape information about a topographic feature or a building acquired at three-dimensional shape information measuring means; a three-dimensional simulator unit configured to automatically recognize and sort environment information from the three-dimensional shape information; and a teacher data output unit configured to output virtual sensor data and teacher data based on the environment information recognized at the three-dimensional simulator unit and a sensor parameter of a sensor.

2 Claims, 10 Drawing Sheets

(56) References Cited

FOREIGN PATENT DOCUMENTS

| | | |
|---|---|---|
| JP | 2014-147509 A | 8/2014 |
| JP | 2014-157509 A | 8/2014 |
| JP | 2016-006616 A | 1/2016 |
| JP | 2016-071597 A | 5/2016 |
| WO | 2011/086889 A1 | 7/2011 |

OTHER PUBLICATIONS

An English machine translation of JP 2006-172099. (Year: 2006).*
Australian Office Action received in corresponding Australian Application No. 2017302833 dated Nov. 6, 2019.
Maturana, D. et al., "3D Convolutional Neural Networks for Landing Zone Detection from LiDAR", 2015 IEEE International Conference on Robotics and Automation (ICRA), May 26-30, 2015, pp. 3471-3478.
Naoya Koketsu et al., Improvement in Human Detection by Generation Addition Training of Human Silhouette, IEICE Technical Report; Oct. 2010.
International Search Report of PCT/JP2017/024099 dated Oct. 3, 2017.
Japanese Office Action received in corresponding Japanese Application No. 2018-529463 dated Feb. 18, 2020.
Australian Office Action received in corresponding Australian Application No. 2017302833 dated Mar. 31, 2020.
Golovinskiy, A. et al., "Shape-based Recognition of 3D Point Clouds in Urban Environments", 2009 IEEE 12th International Conference on Computer Vision (ICCV), Sep. 29, 2009, pp. 2154-2161.
Australian Office Action received in corresponding Australian Application No. 2017302833 dated Oct. 15, 2020.
Scherer, S. et al., "River mapping from a flying robot: state estimation, river detection, and obstacle mapping", Auton Robot (2012), pp. 189-214, published Apr. 25, 2012.

* cited by examiner

DATABASE CONSTRUCTION SYSTEM FOR MACHINE-LEARNING

TECHNICAL FIELD

The present invention relates to a database construction system for machine-learning.

BACKGROUND ART

In mines, mining work machines, such as hydraulic excavators and dump trucks, are commonly used for mining work and transportation work of sediments. From a viewpoint of safety or cost reduction, unmanned mining work machines are demanded for use in mining. In dump trucks, since the transport load of sediments per unit time directly affects the progress of mining, efficient management is required. Therefore, in order to efficiently transport sediments in large quantities to the outside of mining sites, there is a need for a mining system using autonomously driven dump trucks capable of being continuously operated.

However, roads in mines on which dump trucks are driven are unpaved and are usually rough roads. Thus, when dump trucks are autonomously driven for unmanned operation, there are concerns that the trucks collide against obstacles, such as an earthen wall and another vehicle. Suppose that an obstacle is produced on the road and an unmanned dump truck in autonomous operation comes into contact with the obstacle and then stops. This situation stops mining operation for a long time. Therefore, in order to improve the reliability of autonomously driven dump trucks, there is a need for a highly reliable obstacle detection system that enables early detection of a vehicle in front or an obstacle on the road to follow the vehicle in front or avoid the obstacle.

Conventionally, as this type of system for detecting a front vehicle and an obstacle, obstacle detection devices, such as a millimeter wave radar, a laser sensor, a camera, or a stereo camera, are used. The millimeter wave radar has high environmental resistance such that the radar is operable even in the case in which dust blows up or it rains, for example, and also has high measurement range performance. On the other hand, since stereo cameras and laser sensors can measure three-dimensional shapes, these devices can accurately detect obstacles on the road. There is also a method that improves the performance of detecting obstacles by combining these sensors.

In order to develop obstacle detection systems and object recognition systems of high performance, machine learning is used in these years. In machine learning, large volumes of data of sensors are collected, and then tendencies are analyzed to determine parameters. Conventionally, thresholds are usually manually designed based on design data or data on verification experiments. Since these methods are based on designer's experience, reliability is poor, and the number of design processes is also increased. In order to solve such problems, presently, parameters are usually designed using machine learning.

As an example, there is a detection system for an automobile, for example, using a camera; the system is intended for collision avoidance systems of passenger automobiles. First, a camera is mounted on a target vehicle, other vehicles are captured at various places and various dates using the camera, and captured image data is collected. Subsequently, teacher data is created, showing which part of the captured image data is a vehicle that has to be detected by the system. The teacher data is typically manually created sheet by sheet for image data in many cases. The system is subjected to machine learning using this image data and the created teacher data, and hence the system can learn features on the image of the automobile. Parameters are set based on the learned result, and hence an object recognition system can be developed; the system can automatically recognize people in the image by a computer. Examples of such machine learning systems that are often used in these years include Support Vector Machine, Boosting, neural networks, and any other method.

However, object recognition systems using this machine learning have some problems of mounting these systems. One of the problems is a problem of costs for acquiring a large volume of image data. In the case in which an object recognition system based on a machine learning system is developed, large volumes of image data and teacher data have to be prepared for learning. In the case in which no similar piece of information is given as learning data, the system fails to recognize objects. For example, in the case in which a system for detecting automobiles is created, image data that an automobile is captured from the rear side and teacher data are given. In this case, when the system sees the front part of an automobile, the system is difficult to detect the vehicle. Thus, in order to develop an object recognition system that can detect all postures of automobiles, the image data of all postures of automobiles has to be collected in collection of image data for machine learning.

Another problem is costs to collect teacher data. As described above, teacher data is often manually created sheet by sheet for image data. For example, in the case of a system that detects automobiles, a method is used with which a region occupied by an automobile is specified in a rectangle, for example, on a large volume of image data captured in advance and the specified region is given as teacher data. The object recognition system by machine learning typically needs such pairs of image data and teacher data in units ranging from several tens of thousands of pairs to millions of pairs. Thus, creating teacher data for machine learning costs a lot of money.

In the case in which such a system is operated in a mine, the environments are greatly different from the environments of ordinary roads, and hence the system is desirably subjected to machine learning using image data captured in the mine environments. However, compared with ordinary roads in the unified standards, the mine environments are greatly different depending on objects to be mined, the geologic features of sites, for example. Thus, it is difficult to divert image data captured and created on a certain mine and teacher data to learning data for object recognition systems for other mines. In order to solve such problems, image data and teacher data are created on each mine site, and hence an object recognition system having higher detection performances can be mounted. However, in order to achieve this, a bottleneck is expensive costs for creating image data and teacher data described above.

For example, Patent Literature 1 discloses an information processing device having a machine learning module that generates a plurality of pieces of image information formed of input images and teacher images as the expected values of image processing for the input images according to a scenario described in a program code and synthesizes an image processing algorithm by machine learning using the plurality of pieces of generated learning information.

CITATION LIST

Patent Literature

Patent Literature 1: Japanese Unexamined Patent Application Publication No. 2016-71597

SUMMARY OF INVENTION

Technical Problem

However, in the method, similar learning information is generated based on a plurality of original images captured in advance and teacher data. Thus, image data has to be manually captured, and teacher data has to be manually created. In order to reduce costs for creating image data and teacher data using this method, the number of original images that are the sources to create teacher data is inevitably reduced. However, in the object recognition system by machine learning, in the case in which similar pieces of information are given in giving learning information, it is widely known that detection performances are degraded due to over learning. Therefore, in the case in which the method of Patent Literature 1 is applied based on a few number of original images, this might cause over learning. In order to avoid over learning, original images have to be collected in a large volume. As a result, it is expected that reducible costs for creating image data and teacher data are small.

The present invention is made in view of the circumstances. An object is to provide a database construction system for machine-learning that can automatically simply create virtual image data and teacher data in large volumes.

Solution to Problem

The following is a feature of the present invention to solve the problem, for example.

A database construction system for machine-learning includes: a three-dimensional shape data input unit configured to input three-dimensional shape information about a topographic feature or a building acquired at three-dimensional shape information measuring means; a three-dimensional simulator unit configured to automatically recognize and sort environment information from the three-dimensional shape information; and a teacher data output unit configured to output virtual sensor data and teacher data based on the environment information recognized at the three-dimensional simulator unit and a sensor parameter of a sensor.

Advantageous Effects of Invention

According to the present invention, a database construction system for machine-learning that can automatically simply create virtual image data and teacher data in large volumes can be provided. Problems, configurations, and the effect will be apparent from the description of an embodiment below.

DESCRIPTION OF EMBODIMENTS

In the following, an embodiment of the present invention will be described using the drawings, for example. The following description describes specific examples of the content of the present invention. The present invention is non-limiting to the description. The present invention can be variously modified and altered by a person skilled in the art within the scope of technical ideas disclosed in the present specification. In all the drawings for illustrating the present invention, components having the same functions are designated with the same reference signs, and the repeated description is sometimes omitted.

First Embodiment

The present embodiment is an example in the case in which a machine learning database is constructed with the present invention, a machine learning system is learned using the database, and an object recognition system is configured using the machine learning system. The machine learning database is used for detecting objects by external sensing systems intended for autonomous vehicles, for example.

In a machine learning database according to the embodiment, the three-dimensional shape data of environments and the three-dimensional shape data of an object that is a detection target are inputted to automatically create scenes at a three-dimensional simulator unit, and hence virtual image data and teacher data can be automatically generated, not manually. Thus, a system for automatically constructing a machine learning database can be provided. The system can inexpensively provide learning information, such as image data and teacher data, necessary to mount an object recognition system using machine learning.

In a sensor calibration system according to the embodiment, three-dimensional shape information acquiring means using an unmanned aerial vehicle (UAV), for example, accurately measures the positions and the shapes of calibration landmarks and estimates the position of a vehicle, and hence the positions of sensors between the sensors and the positions of sensor vehicles between the vehicles can be highly accurately estimated and corrected. Thus, an obstacle detection system using sensors can be operated in a sound manner.

Figure 1:
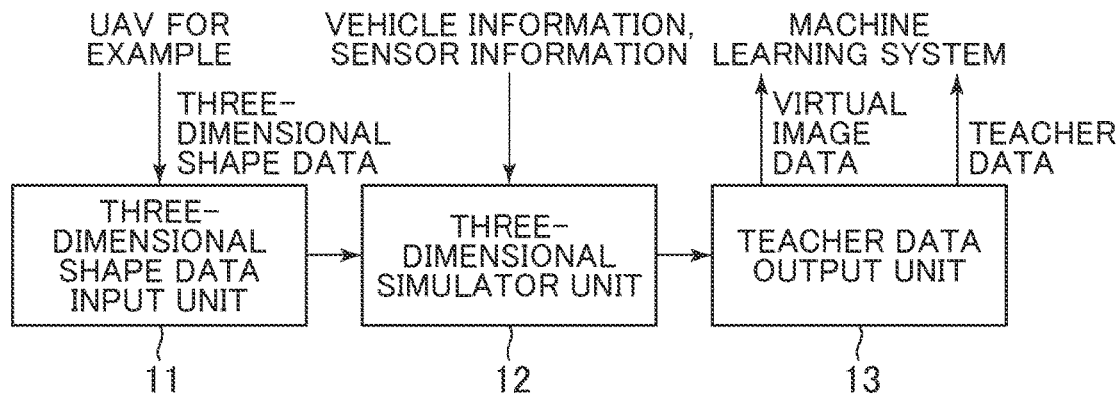
FIG. 1 is a diagram of the configuration of an embodiment of the present invention.
Figure 2:
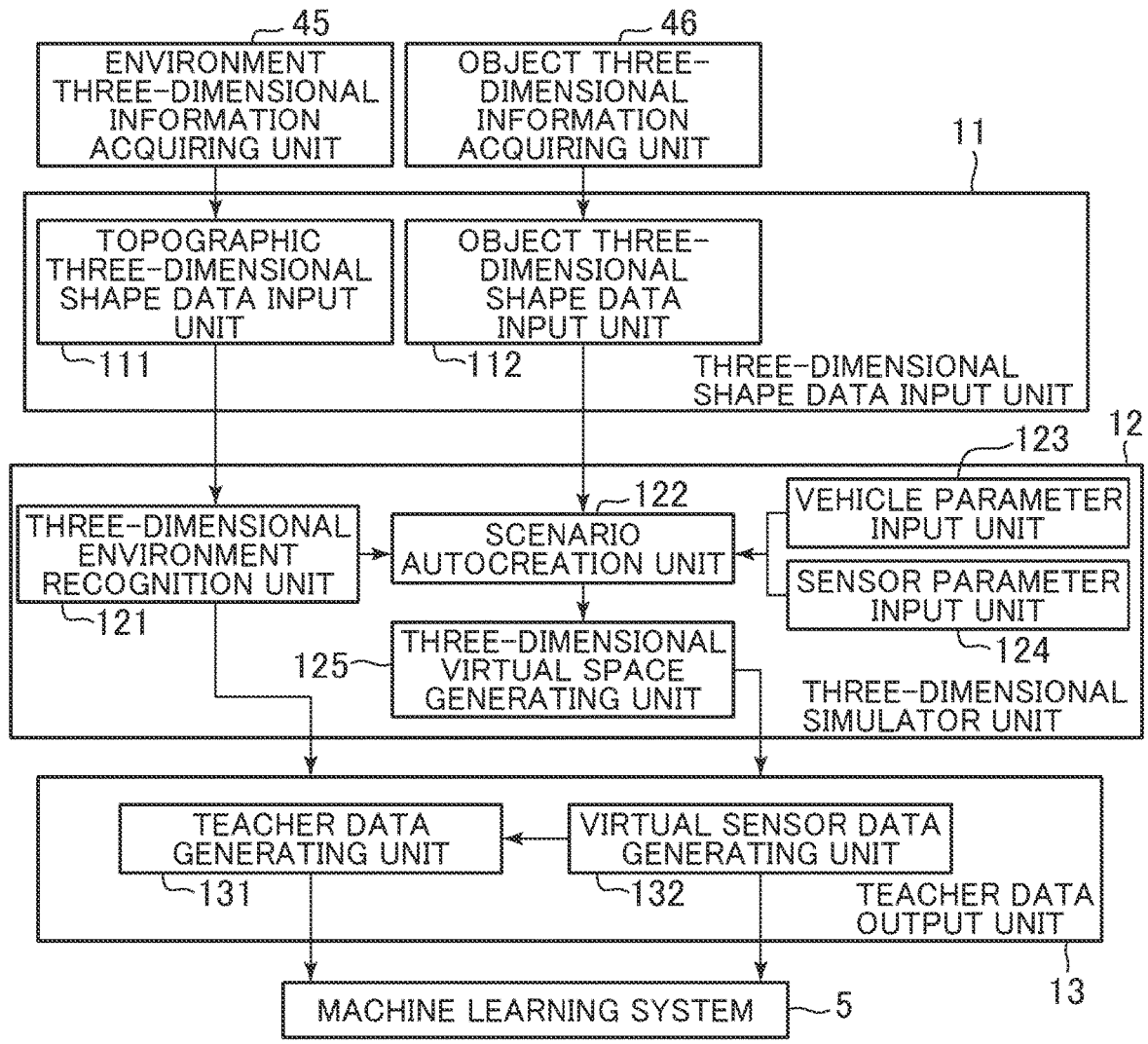
FIG. 2 is a diagram of an example of the detailed configuration according to an embodiment of the present invention.
Figure 3:
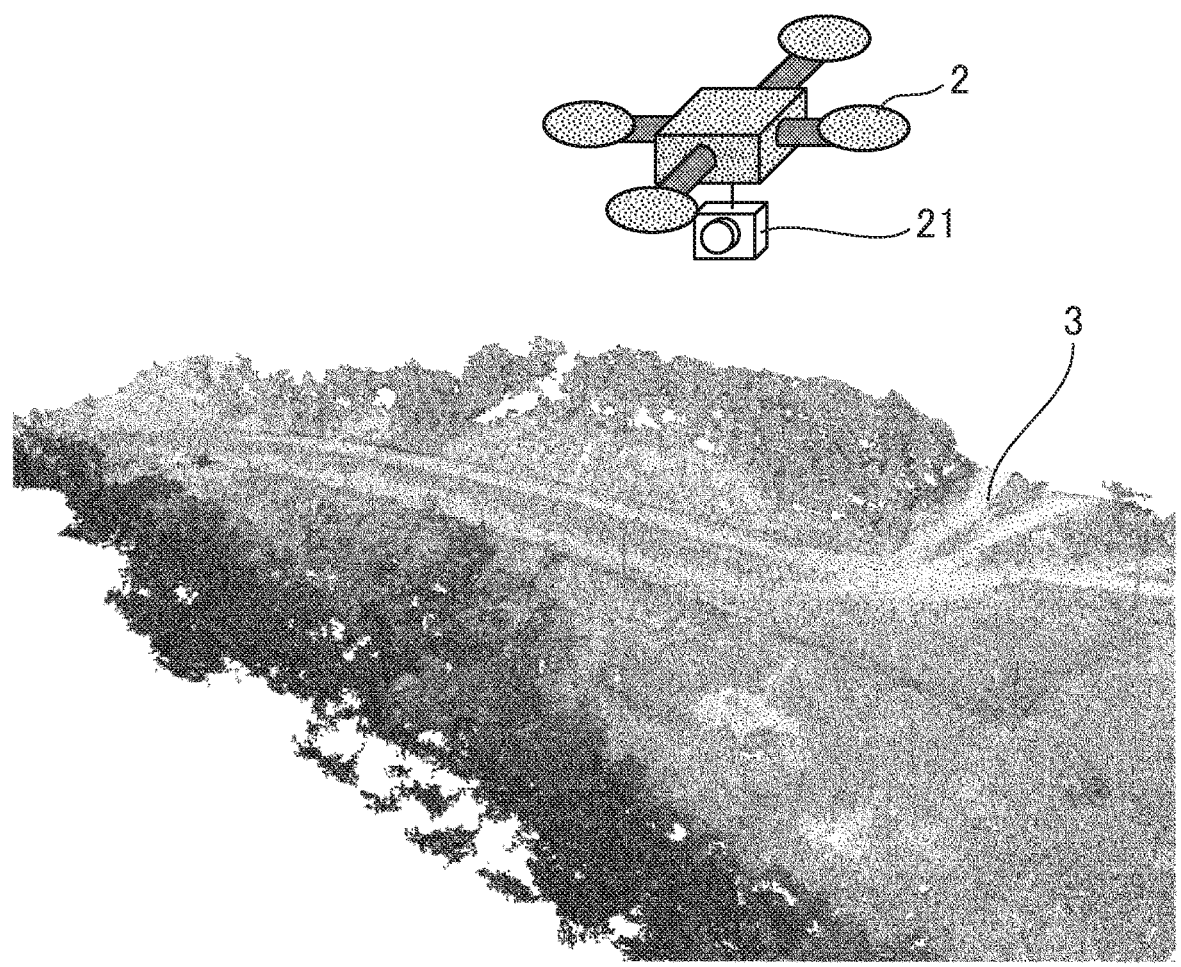
FIG. 3 shows an exemplary configuration of acquiring topographic three-dimensional shape information.

FIG. 1 is a diagram of the configuration according to the embodiment. FIG. 2 is a diagram of an example of the detailed configuration according to an embodiment of the present invention. FIG. 3 shows an exemplary configuration of acquiring topographic three-dimensional shape information.

In the embodiment, first, a three-dimensional shape data input unit 11 acquires topographic three-dimensional shape information about a measurement target 3. Subsequently, vehicle information and sensor information are inputted to a three-dimensional simulator unit 12, and then the virtual space of an environment is generated. Subsequently, a teacher data output unit 13 gives a group of virtual image data and teacher data as a database for teacher data to a machine learning system based on information about the virtual space, vehicle information acquired in advance, and sensor information. Thus, an object recognition system can be constructed in which the machine learning system learns based on virtual image data and teacher data and can recognize an object that is the learned measurement target.

Next, FIG. 2 shows the detailed configuration of the embodiment. In the following description, the embodiment will be described based on the configuration.

First, using environment three-dimensional information acquiring means 45, the three-dimensional shape data of the measurement target 3 is given to a topographic three-dimensional shape data input unit 111 of the three-dimensional shape data input unit 11. An example of a method (three-dimensional shape information measuring means) of measuring a three-dimensional shape that can be thought includes a method with which an aerial photography camera 21 or a sensor, such as a laser infrared radar (Lidar), is mounted on an unmanned aerial vehicle (UAV) 2 as illustrated in FIG. 3, for example. At this time, the environment three-dimensional shape information acquiring unit 45 is configured to measure and acquire information in which a camera, a Lidar, a millimeter wave radar, an ultrasonic sensor, and a similar sensor that can acquire environment shapes or can acquire the luminance, color information, and temperature information of environments are mounted on the airframe of an unmanned aerial vehicle, a manned aerial vehicle, an artificial satellite, and any other aerial vehicle, for example. However, the configuration is non-limiting as long as three-dimensional shape information can be acquired. The environment three-dimensional shape data can also be acquired by a configuration in which a camera or a Lidar and a global positioning system are mounted on an automobile.

As illustrated in FIG. 2, in the case in which topographic three-dimensional shape information about the measurement target 3 is acquired using the UAV 2 and the aerial photography camera 21, in the configuration, first, the UAV 2 is flown over the measurement target 3. In this fight, the measurement target 3 is continuously captured by the aerial photography camera 21. At this time, images are desirably captured such that the length of a captured image is overlapped with the adjacent captured images by approximately 80%, and the width is overlapped by approximately 60%.

Figure 4:
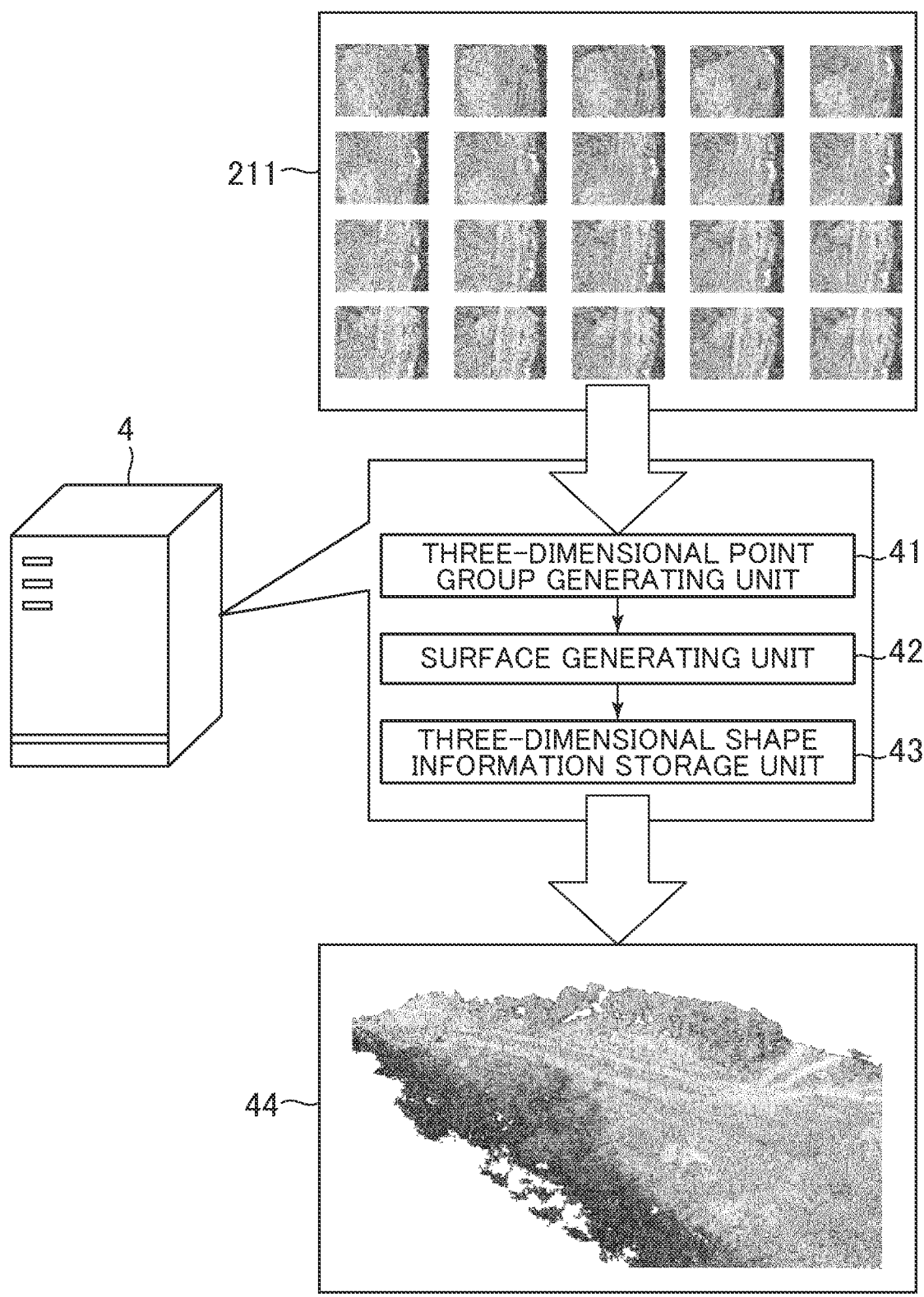
FIG. 4 shows an exemplary method of generating a topographic three-dimensional shape.

Next, FIG. 4 shows a method of acquiring three-dimensional shape information from images captured using the UAV 2. FIG. 4 shows an exemplary method of generating a topographic three-dimensional shape. In a three-dimensional point group generating unit 41 that is an algorithm mounted on a three-dimensional reconstruction computer 4 using images 211 captured by the UAV 2, three-dimensional shape information about the measurement target 3 can be acquired as point group information using Structure from Motion (SfM) and Multi View Stereo (MVS). A surface generating unit 42 meshes information based on the three-dimensional point group information, and generates three-dimensional surface information having texture information and normal vector information about surfaces. This three-dimensional shape information is saved on a three-dimensional shape information storage unit 43. Note that these techniques are publicly known techniques, and omitted here. As described above, three-dimensional topographic shape data 44 of the measurement target can be acquired.

Subsequently, in the object recognition system using a machine learning system 51, object three-dimensional information acquiring means 46 measures three-dimensional information about an object that is desired to be a measurement target, and gives three-dimensional shape information as a three-dimensional point group and mesh information to an object three-dimensional shape data input unit 112 of the three-dimensional shape data input unit 11. At this time, it can be considered that the object three-dimensional information acquiring means 46 has a configuration similar to the configuration of the environment three-dimensional information acquiring means 45. Examples that can be considered include means that acquires object three-dimensional shape information using a monocular camera or a plurality of cameras, SfM, and MVS, or a measuring method using a Lidar, and any other unit or method. Note that these techniques are also publicly known techniques, and omitted here. Note that in the input of object three-dimensional shape information to the object three-dimensional shape data input unit 112, this information is given as information having actual scale information, such as meters, and vertical direction information about object three-dimensional shape information is also given. For example, in the case in which information about an object to be inputted is information about a vehicle, tires are set to a downward direction of the object, and the roof is set to an upward direction.

Note that at this time, the object three-dimensional information acquiring means 46 may give a plurality of types of three-dimensional shape information. For example, in the case in which an object recognition system that can recognize dump trucks, power shovels, and workers is configured in the end, the three-dimensional shape data of dump trucks, power shovels, and workers is inputted to the object three-dimensional shape data input unit 112.

As described above, the three-dimensional shape data input unit 11 can acquire necessary three-dimensional shape information. Subsequently, processing using these pieces of information will be described.

Figure 5:
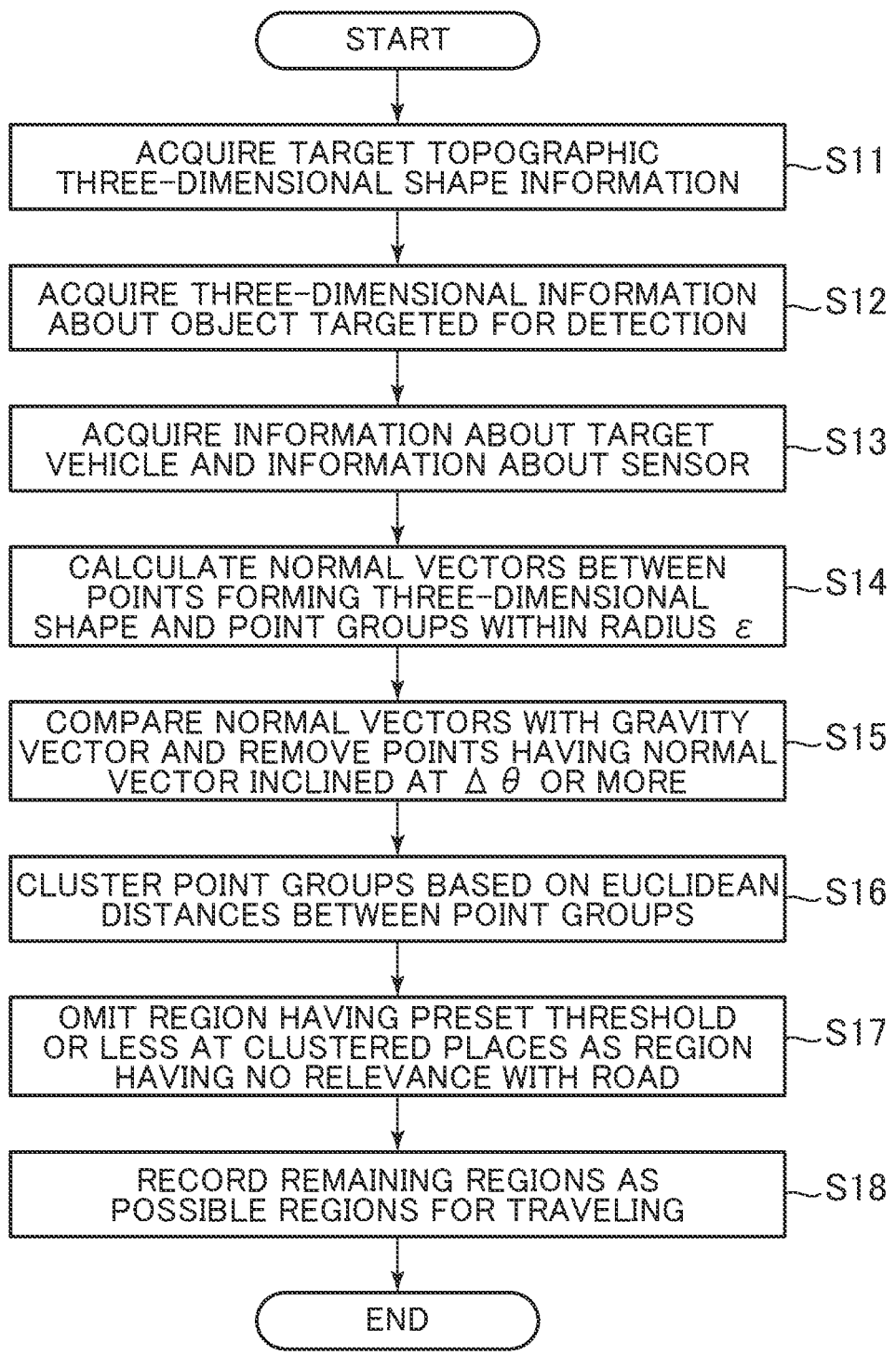
FIG. 5 shows an example of process procedures by a three-dimensional environment recognition unit.

The topographic three-dimensional shape data input unit 111 delivers the received topographic three-dimensional shape information to the three-dimensional environment recognition unit 121. The three-dimensional environment recognition unit 121 automatically recognizes received topographic environment information based on this information. As an example, FIG. 5 shows a method of extracting a possible traveling region for a given vehicle as environment information from topographic three-dimensional shape information at the three-dimensional environment recognition unit 121. The method will be described. FIG. 5 shows an example of process procedures at the three-dimensional environment recognition unit.

First, topographic three-dimensional shape information about an environment that is a target is acquired. For example, in the case of a system used in Mine A, three-dimensional shape information about Mine A is inputted here (S11). Here, it is supposed that the three-dimensional shape information is received as three-dimensional point group information. Subsequently, three-dimensional shape information about the object that is a detection target is acquired (S12). Subsequently, information about a target vehicle and information about a sensor are acquired (S13). Here, regarding the target vehicle, in the case in which it is desired to develop an object recognition system to be mounted using a database to be constructed for Vehicle type A, information about Vehicle type A is given as information about the target vehicle. At this time, the information to be given includes the shape of the target vehicle, the velocity range in traveling, road ability on ascents and descents, and control performance over steps and obstacles, for example. The sensor information is a type of sensor to be mounted on a target vehicle for recognition of obstacles and the measurement performance of the sensor. For example, in the case in which a camera is used as a sensor, internal parameters, such as the resolution of the camera, the frame rate, the focal length and distortion of the lens, and positional information about the installation of the sensor, such as the installed position and the angle of the camera, are given. Subsequently, a possible traveling region for the target vehicle is estimated from the acquired topographic information based on the acquired information. First, normal vectors are individually calculated for points based on the points in a three-dimensional point group and points neighboring the point group (S14). At this time, the neighboring points to a given point that is the reference to calculate the normal vectors are determined on the basis that these points are located within a distance ε1 from the given point. The distance ε1 is a threshold preset by a user. At this time, for search for neighboring points to the given point, high-speed proximity point search methods, such as k-dimensional trees and Locality-sensitive hashing, are desirably used. Subsequently, the normal vectors of the calculated points are compared on the gravity vector and the inclination. At this time, the point group having a normal vector inclined at an angle of θ or more is removed (S15). At this time, θ is desirably set based on angles at which the target vehicle can climb up and down. Subsequently, the remaining point groups are clustered based on the Euclidean distance between the point groups (S16). In this clustering process, the point groups are clustered based on a preset threshold ε2. For example, a determination is made in which points within the threshold ε2 are connected to Point A and Point B that are given points and points that are apart from the threshold ε2 or more are not connected. Under the conditions, in the case in which Point A can reach Point B through other points within the threshold ε2 even though given Point A is apart from given Point B by the threshold ε2 or more, Point A and Point B are sorted into the same class. After all the points in the point groups are clustered, all the points are projected onto a two-dimensional coordinate system with the height removed from three-dimensional coordinates. A rectangle properly including all the point groups constituting each class sorted in S16 is found, regions having values equal to or below the preset threshold are not the possible region for traveling, and the point groups belonging to these classes are removed (S17). After these processes, the remaining regions are possible regions for traveling, and the regions are recorded as environment information (S18).

Figure 6:
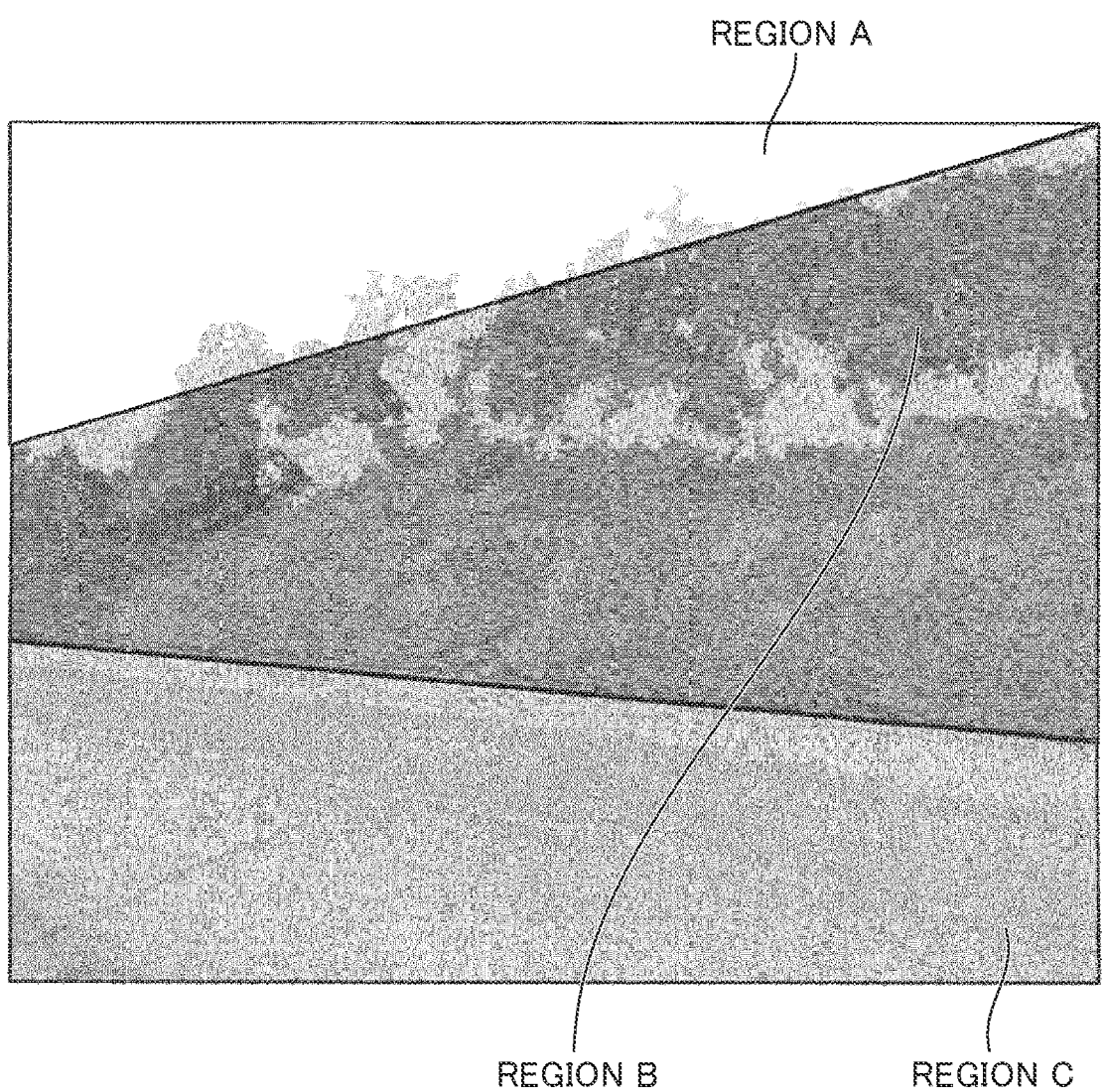
FIG. 6 shows an exemplary recognized result by the three-dimensional environment recognition unit.

FIG. 6 shows an example of environment information extracted by the processes described above. Here, regions are sorted; Region A is a blank region, Region B is a region in which no target vehicle can travel, and Region C is a possible traveling region for the target vehicle. FIG. 6 shows an exemplary recognized result by the three-dimensional environment recognition unit.

Figure 7:
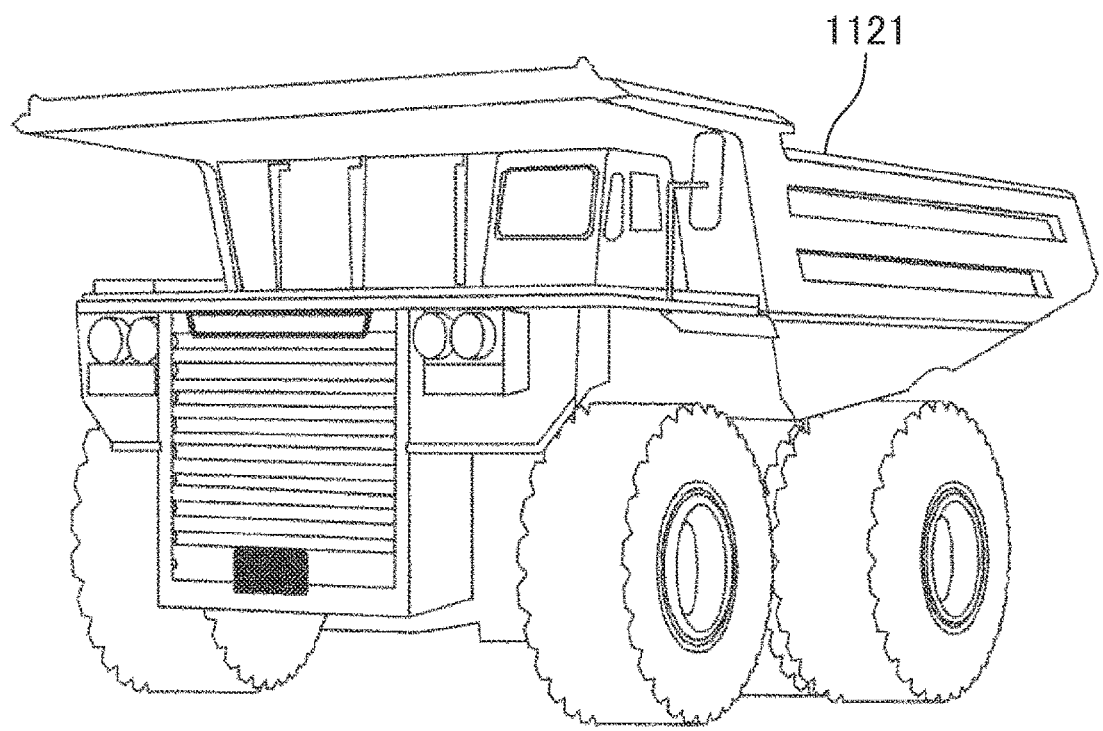
FIG. 7 shows an example of object three-dimensional shape data treated in an embodiment of the present invention.

Subsequently, environment information recognized at the three-dimensional environment recognition unit 121 is given to a scenario autocreation unit 122. The scenario autocreation unit is responsible for creating a scene from the acquired topographic three-dimensional shape information and the object three-dimensional shape information. For example, supposed that object three-dimensional shape data 1121 that is a dump truck as illustrated in FIG. 7 is given as a detection target by the object recognition system. FIG. 7 shows an example of object three-dimensional shape data treated in an embodiment of the present invention.

Figure 8:
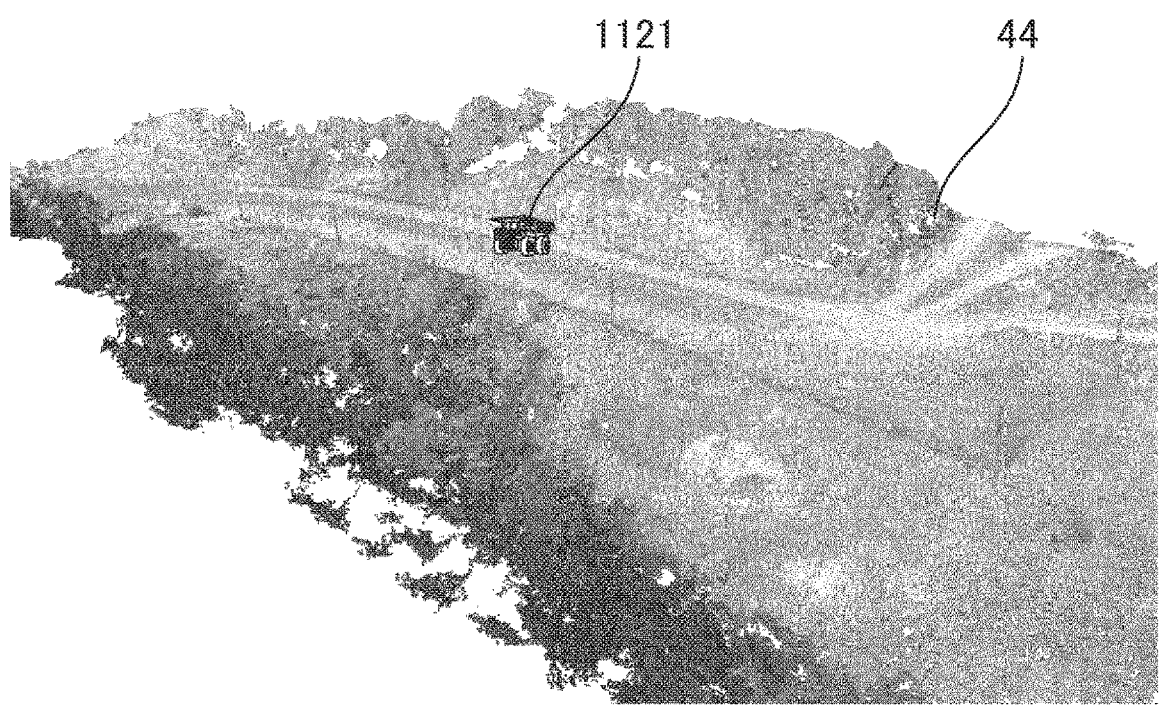
FIG. 8 shows an exemplary scene generated at a three-dimensional virtual space generating unit.

Subsequently, the scenario autocreation unit 122 determines on which region this dump truck is possibly present from the dump truck, topographic three-dimensional shape data given by the three-dimensional environment recognition unit 121, and the environment information. For example, in the case in which one point is randomly selected from the point group determined as a possible region for traveling at the three-dimensional environment recognition unit 121 and the dump truck is placed at the point, the unit 122 determines whether the footprint of the dump truck deviates from the possible region for traveling. In the case in which the footprint deviates from the region, a point is again randomly selected. In the case in which the footprint does not deviate, the unit 122 determines that the dump truck is placed at that place. The scenario autocreation unit 122 gives these pieces of information to a three-dimensional virtual space generating unit 125, and the unit 125 virtually places the dump truck based on the scenario set by the scenario autocreation unit 122. FIG. 8 shows an example of the scene. FIG. 8 shows an exemplary scene generated at the three-dimensional virtual space generating unit.

FIG. 8 shows that the object three-dimensional shape data 1121 that is the dump truck is synthesized on the three-dimensional topographic shape data 44. The object three-dimensional shape data 1121 that is the dump truck is placed on the possible region for traveling. A three-dimensional virtual space is generated at the three-dimensional simulator unit 12 based on the processes described above.

Figure 9:
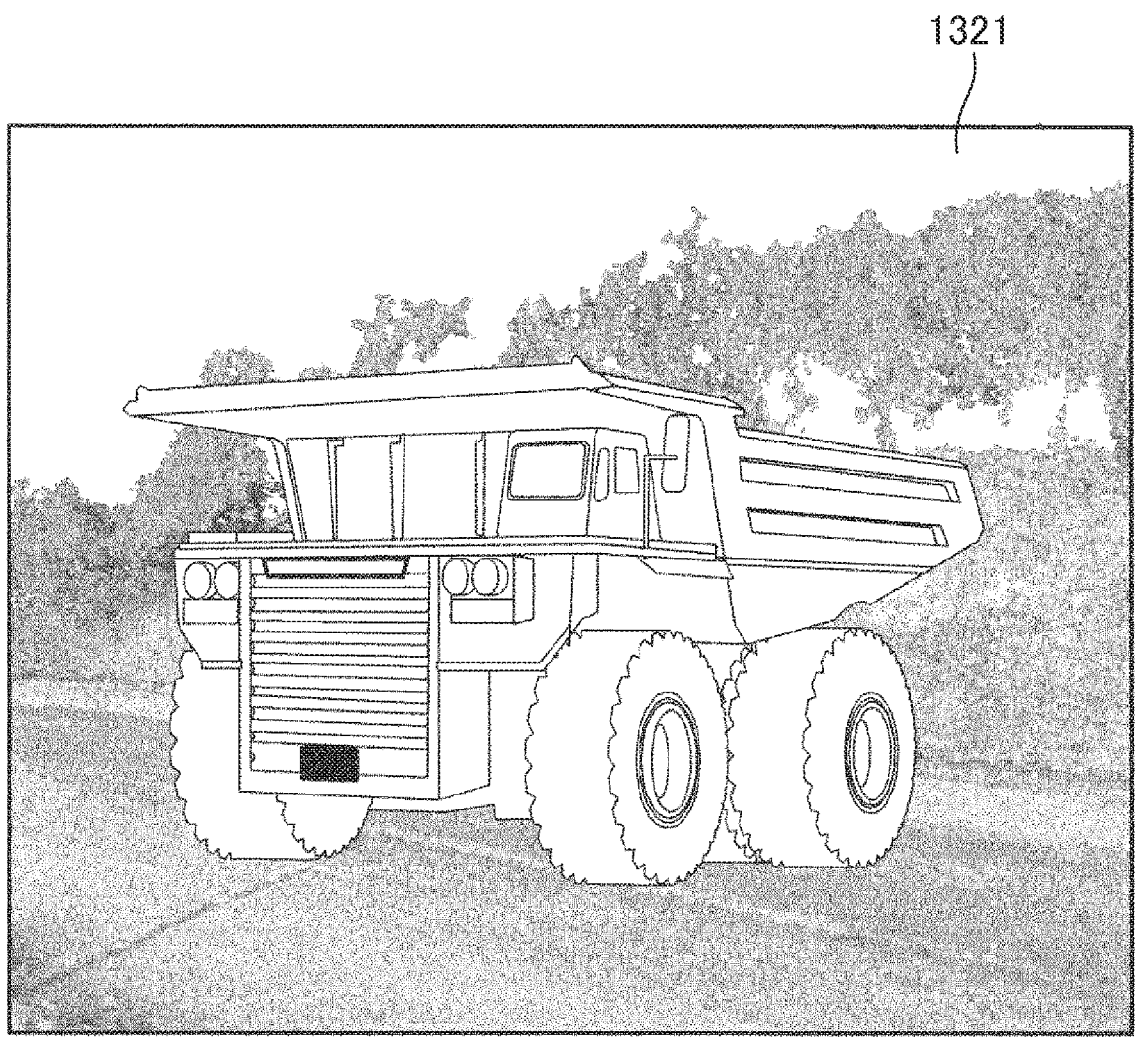
FIG. 9 shows an example of virtual sensor data generated at a virtual sensor data generating unit.

Lastly, a teacher data generating unit 131 of the teacher data output unit 13 generates teacher data, and a virtual sensor data generating unit 132 generates virtual sensor data based on information about the generated three-dimensional virtual space. First, the position of the target vehicle on the three-dimensional virtual space is determined based on vehicle information inputted by a vehicle parameter input unit 123 of the three-dimensional simulator unit 12. This is a method similar to the method of placing the object three-dimensional shape data 1121 described at the scenario autocreation unit 122. However, in the case in which the footprint of the object three-dimensional shape data 1121 that is placed in advance is superposed on the footprint of the target vehicle, a point is again selected. Subsequently, after the position of the target vehicle is set, the virtual sensor data generating unit 132 generates virtual sensor data corresponding to parameters inputted by a sensor parameter input unit 124 of 124. For example, in the case in which sensor data is inputted by a camera, a two-dimensional image that the camera possibly acquires is generated by perspective projection transformation based on the installed position of the camera, the performance of the imaging device, and the performance and distortion of the lens. FIG. 9 shows an example of virtual sensor data 1321 generated by the process. FIG. 9 shows an example of virtual sensor data generated at the virtual sensor data generating unit.

Figure 10:
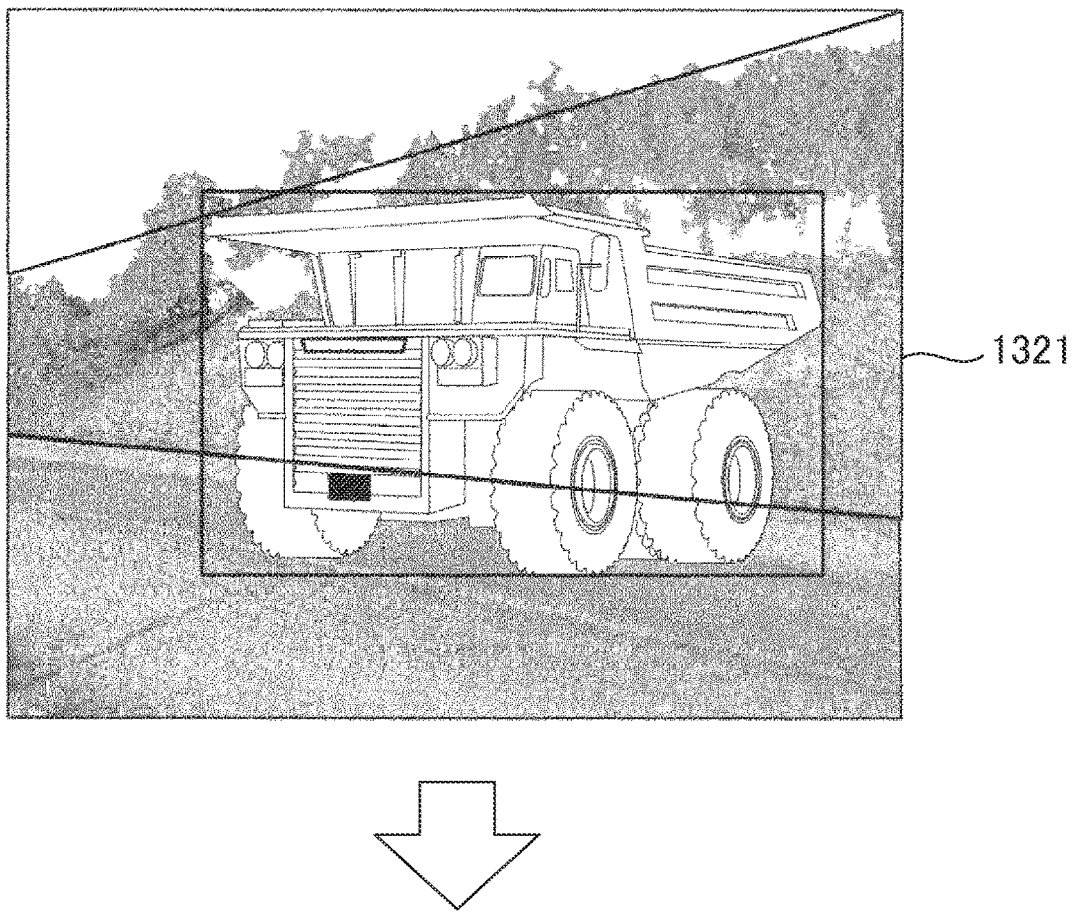
FIG. 10 shows an example of teacher data generated at a teacher data generating unit.
Figure 10:
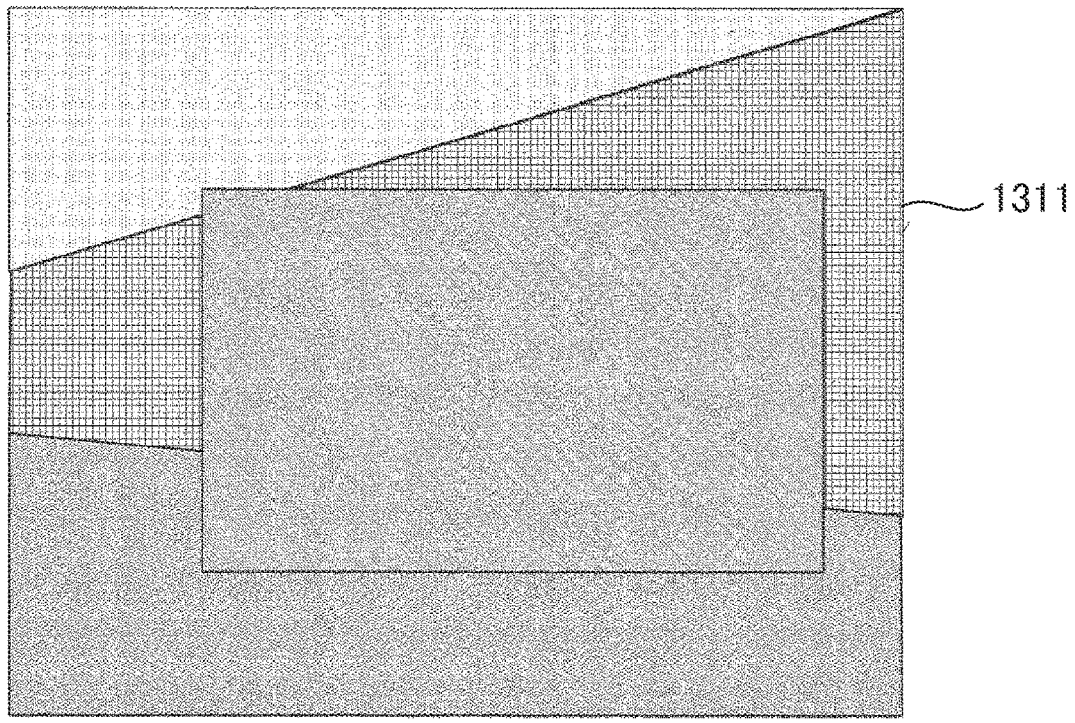

Subsequently, teacher data corresponding to the virtual sensor data 1321 is created. For creating teacher data, environment information recognized at the three-dimensional environment recognition unit 121 is used. For example, in the case in which environment information is sorted for each of the points constituting topographic three-dimensional shape information at the three-dimensional environment recognition unit 121, the teacher data generating unit 131 generates teacher data having environment information for each of the pixels of a two-dimensional image acquired as virtual sensor data. For example, in the case in which the virtual sensor data 1321 is generated as shown in FIG. 10, environment information for each pixel is created as teacher data. Thus, the teacher data generating unit generates teacher data 1311. As described above, the virtual sensor data 1321 and the teacher data 1311 can be generated. FIG. 10 shows an example of teacher data generated at the teacher data generating unit.

Figure 11:
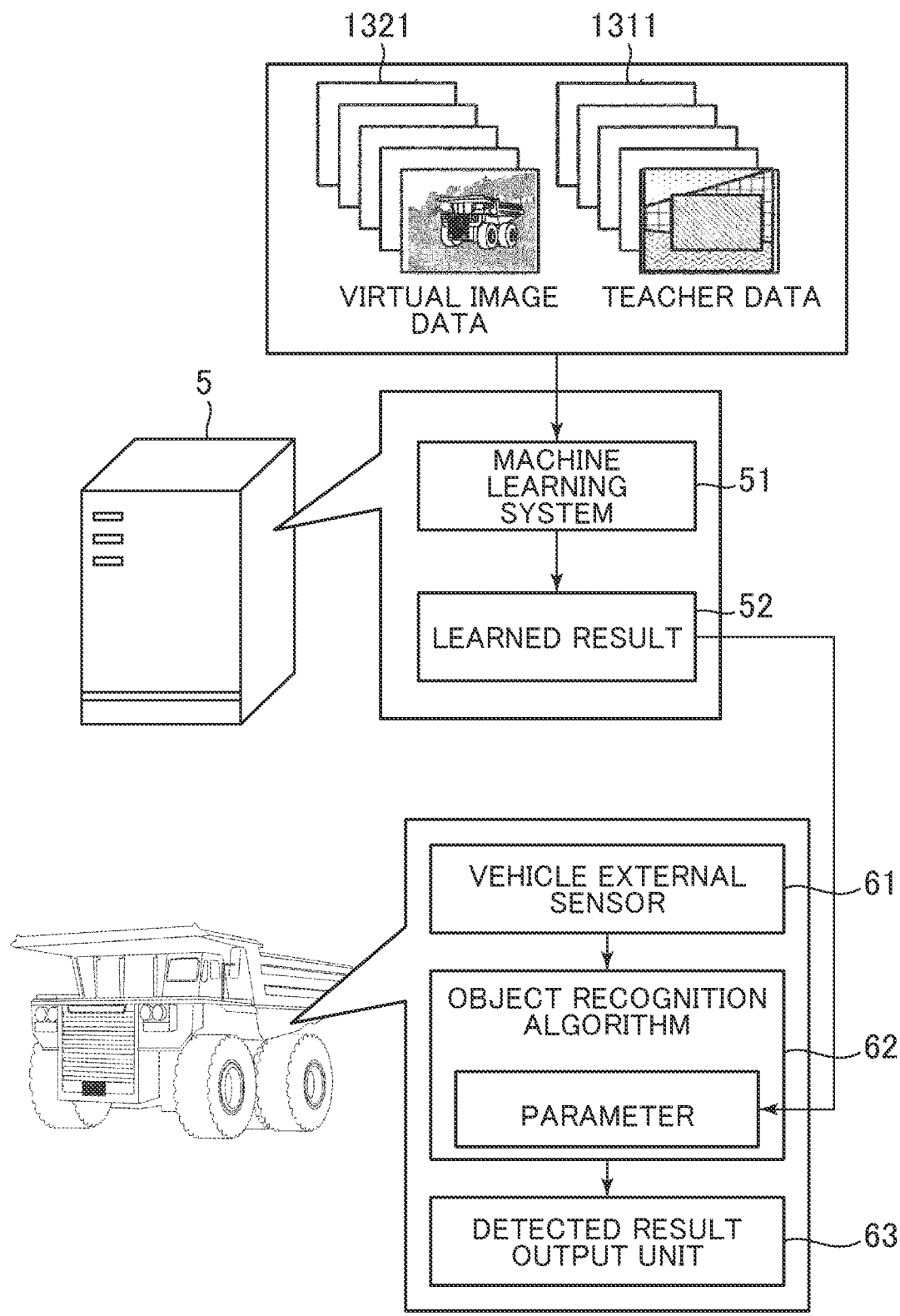
FIG. 11 shows an exemplary method of operating an object recognition algorithm using generated virtual sensor data and generated teacher data.

After that, the process is again returned to the process at the scenario autocreation unit 122, the unit 122 generates a new scenario, and then virtual sensor data and teacher data are generated. The process is repeated to generate large volumes of virtual sensor data and teacher data. The process is shown in FIG. 11. FIG. 11 shows an exemplary method of operating an object recognition algorithm using generated virtual sensor data and generated teacher data.

Figure 12:
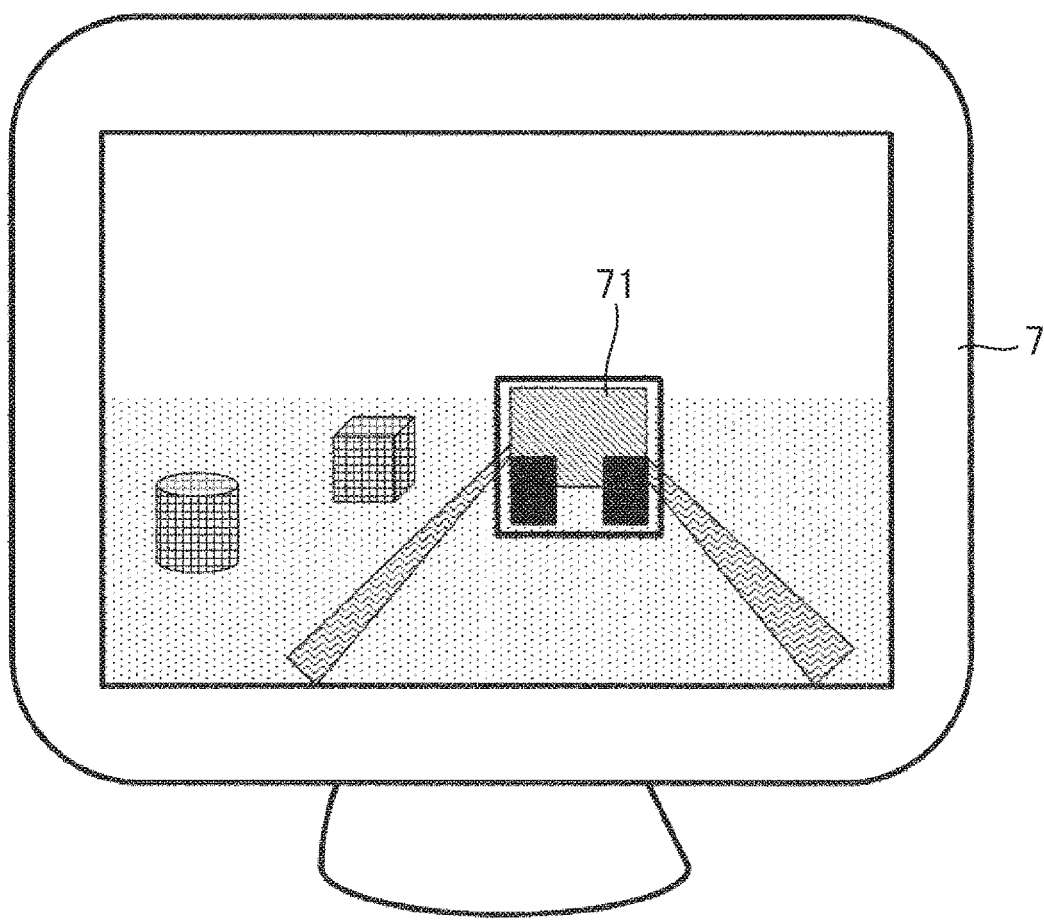
FIG. 12 shows an exemplary detected result by the object recognition algorithm.

The virtual sensor data 1321 and the teacher data 1311 are given to the machine learning system 511 on a machine learning computer 5 for conducting machine learning. As a machine learning method that is used here, Support Vector Machine, Boosting, and neural networks, or advanced methods of these are considered. These methods are publicly known techniques, and omitted here. The acquired learned result 52 is given as parameters for an object recognition algorithm 62. As the parameters that are acquired from the learned result at this time, appropriate feature values for recognition of an object that is a detection target or thresholds necessary to recognize an object using the feature values, for example, are considered. The object recognition algorithm 62 having these inputted parameters detects a learned object or an object similar to the learned object from information acquired from a vehicle external sensor 61, and delivers information about the object to a detected result output unit 63. An example of the information is shown in FIG. 12. FIG. 12 shows an exemplary detected result by the object recognition algorithm.

The position of a vehicle in front of the target vehicle is displayed as a detected result 71 on a display 7 placed in the vehicle. Other than this method, a method can also be considered with which the target vehicle is noticed by an alarm in the case in which the target vehicle comes extremely close to a detected object, for example.

LIST OF REFERENCE SIGNS 11 three-dimensional shape data input unit
111 topographic three-dimensional shape data input unit
112 object three-dimensional shape data input unit
1121 object three-dimensional shape data
12 three-dimensional simulator unit
121 three-dimensional environment recognition unit
122 scenario autocreation unit
123 vehicle parameter input unit
124 sensor parameter input unit
125 three-dimensional virtual space generating unit
131 teacher data output unit
1311 teacher data
132 virtual sensor data generating unit
1321 virtual sensor data
2 UAV
21 aerial photography camera
211 captured image
3 measurement target
4 three-dimensional reconstruction computer
41 three-dimensional point group generating unit
42 surface generating unit
43 three-dimensional shape information storage unit
44 three-dimensional topographic shape data
45 environment three-dimensional information acquiring means
46 object three-dimensional information acquiring means
5 machine learning computer
51 machine learning system
52 learned result
61 vehicle external sensor
62 object recognition algorithm
63 detected result output unit
7 display
71 detected result

The invention claimed is:

1. A database construction system for machine-learning comprising:
   a three-dimensional shape data input unit configured to input three-dimensional shape information about a topographic feature or a building acquired at a three-dimensional shape information measuring means;
   a three-dimensional simulator unit configured to input vehicle information and automatically recognize and sort environment information from the three-dimensional shape information; and
   a teacher data output unit configured to output virtual sensor data and teacher data based on the environment information recognized at the three-dimensional simulator unit, the vehicle information and a sensor parameter of a sensor,
   wherein the three-dimensional shape data input unit includes:
      a topographic three-dimensional shape data input unit configured to input the three-dimensional shape information, and
      an object three-dimensional shape data input unit configured to input three-dimensional shape data of a given object; and
   wherein the three-dimensional simulator unit includes a three-dimensional virtual space generating unit configured to integrate information of the topographic three-dimensional shape data input unit with information of the three-dimensional shape data input unit to generate virtual space.

2. The database construction system for machine-learning according to claim 1,
   wherein the three-dimensional simulator unit includes a scenario autocreation unit configured to randomly create object three-dimensional shape information and a relative position of the object three-dimensional shape information based on the three-dimensional shape information input to the topographic three-dimensional shape data input unit, the environment information extracted at a three-dimensional environment recognition unit, and the three-dimensional shape data of the given object input to the object three-dimensional shape data input unit.

\* \* \* \* \*